US008238893B2

(12) United States Patent
Bolton et al.

(10) Patent No.: US 8,238,893 B2
(45) Date of Patent: Aug. 7, 2012

(54) TECHNIQUES FOR CONTROLLING A PORTABLE MEDIA DEVICE HAVING A RADIO FREQUENCY TUNER

(75) Inventors: Lawrence Bolton, Fremont, CA (US); Jason J. Yew, San Jose, CA (US)

(73) Assignee: Apple Inc., Cupertino, CA (US)

( * ) Notice: Subject to any disclaimer, the term of this patent is extended or adjusted under 35 U.S.C. 154(b) by 337 days.

(21) Appl. No.: 12/553,850

(22) Filed: Sep. 3, 2009

(65) Prior Publication Data

US 2011/0053510 A1 Mar. 3, 2011

(51) Int. Cl.
*H04M 3/00* (2006.01)
(52) U.S. Cl. ...... 455/420; 455/418; 455/3.01; 455/3.05; 455/3.06; 455/41.2; 455/41.3; 455/556.1; 455/556.2; 455/569.1; 455/569.2; 455/95; 455/344; 455/349
(58) Field of Classification Search ............. 455/3.01, 455/3.05, 3.06, 418–420, 41.2–41.3, 74, 455/74.1, 556.1, 556.2, 557, 569.1–569.2, 455/573, 575.1, 575.9, 95, 99, 344–349, 455/343.1, 343.6
See application file for complete search history.

(56) References Cited

U.S. PATENT DOCUMENTS

| | | | |
|---|---|---|---|
| 4,673,861 A | 6/1987 | Dubovsky et al. | |
| 5,303,393 A | 4/1994 | Noreen et al. | |
| 5,794,127 A | 8/1998 | Lansang | |
| 6,230,205 B1 | 5/2001 | Garrity et al. | |
| 6,272,328 B1 | 8/2001 | Nguyen et al. | |
| 6,505,160 B1 | 1/2003 | Levy et al. | |
| 6,591,085 B1 * | 7/2003 | Grady | 455/42 |
| 6,782,239 B2 * | 8/2004 | Johnson et al. | 455/42 |
| 6,788,528 B2 * | 9/2004 | Enners et al. | 361/679.41 |
| 6,813,528 B1 | 11/2004 | Yang | |
| 7,013,164 B2 | 3/2006 | Lin | |

(Continued)

FOREIGN PATENT DOCUMENTS

EP 1049278 A1 11/2000

(Continued)

OTHER PUBLICATIONS

Detweiler, "Conversion Requirements for AM & FM IBOC Transmission," iBiquity Digital Corporation, [online], [retrieved Dec. 12, 2008]. Retrieved from the Internet <URL: http://www.ibiquity.com/i/pdfs/Conversion_Requirements.pdf> 7 pages.

(Continued)

*Primary Examiner* — Tuan A Tran
(74) *Attorney, Agent, or Firm* — Kilpatrick Townsend & Stockton LLP (57) ABSTRACT

Techniques for facilitating interoperation between a portable media device having an RF tuner and an accessory device. In certain embodiments, the portable media device and the accessory can exchange various commands pertaining to the capabilities, state, and/or operation of the tuner. For example, in one set of embodiments the accessory can send one or more commands requesting information about the capabilities of the tuner, and the portable media device can provide the requested capability information. In another set of embodiments, the accessory can send one or more commands requesting execution of a particular action with respect to the tuner, and the portable media device can perform the requested action. In this manner, certain embodiments of the present invention enable a user to control the tuner functionality of the portable media device via the accessory, rather than, e.g., via an input interface located directly on the portable media device.

25 Claims, 4 Drawing Sheets

U.S. PATENT DOCUMENTS

| | | | |
|---|---|---|---|
| 7,062,261 | B2 | 6/2006 | Goldstein et al. |
| 7,187,947 | B1 * | 3/2007 | White et al. ............... 455/556.1 |
| 7,293,122 | B1 | 11/2007 | Schubert et al. |
| 7,441,058 | B1 | 10/2008 | Bolton et al. |
| 2002/0010759 | A1 | 1/2002 | Hitson et al. |
| 2002/0065074 | A1 | 5/2002 | Cohn et al. |
| 2002/0132575 | A1 | 9/2002 | Kesling et al. |
| 2002/0132651 | A1 * | 9/2002 | Jinnouchi ..................... 455/573 |
| 2002/0151327 | A1 | 10/2002 | Levitt |
| 2002/0183059 | A1 | 12/2002 | Noreen et al. |
| 2003/0040272 | A1 | 2/2003 | Lelievre et al. |
| 2003/0059022 | A1 | 3/2003 | Nebiker et al. |
| 2003/0220988 | A1 | 11/2003 | Hymel |
| 2003/0236075 | A1 | 12/2003 | Johnson et al. |
| 2004/0019497 | A1 | 1/2004 | Volk et al. |
| 2004/0116005 | A1 | 6/2004 | Choi |
| 2004/0117855 | A1 | 6/2004 | Nakamura |
| 2004/0127199 | A1 | 7/2004 | Kagan et al. |
| 2004/0162029 | A1 * | 8/2004 | Grady ............................ 455/42 |
| 2005/0014536 | A1 | 1/2005 | Grady |
| 2005/0014538 | A1 | 1/2005 | Hyun et al. |
| 2005/0020223 | A1 | 1/2005 | Ellis et al. |
| 2005/0047071 | A1 | 3/2005 | Tse Chun Hin |
| 2005/0181756 | A1 | 8/2005 | Lin |
| 2005/0227612 | A1 | 10/2005 | Helstrom et al. |
| 2006/0094349 | A1 * | 5/2006 | Slesak et al. ................. 455/3.02 |
| 2006/0184960 | A1 | 8/2006 | Horton et al. |
| 2006/0235864 | A1 | 10/2006 | Hotelling et al. |
| 2007/0077784 | A1 * | 4/2007 | Kalayjian et al. ............... 439/61 |
| 2007/0206827 | A1 | 9/2007 | Tupman et al. |
| 2008/0015717 | A1 * | 1/2008 | Griffin et al. ................... 700/94 |
| 2008/0125031 | A1 | 5/2008 | Fadell et al. |
| 2008/0188209 | A1 | 8/2008 | Dorogusker et al. |
| 2008/0298440 | A1 | 12/2008 | Kroeger et al. |
| 2009/0125134 | A1 | 5/2009 | Bolton et al. |

FOREIGN PATENT DOCUMENTS

| | | |
|---|---|---|
| EP | 1367734 A1 | 12/2003 |
| EP | 1650971 A1 | 4/2006 |
| EP | 1942393 A1 | 7/2008 |
| EP | 2160024 A2 | 3/2010 |
| JP | 11-288420 | 10/1999 |
| WO | WO 95/01058 A1 | 1/1995 |
| WO | WO 2005/024818 A1 | 3/2005 |
| WO | WO 2008/080006 A2 | 7/2008 |

OTHER PUBLICATIONS

Grabianowski, "How HD Radio Works," [online], [retrieved Dec. 8, 2008]. Retrieved from the Internet, <URL: http://electronics.howstuffworks.com/hd-radio.htm/printable>.

Griffin—radio SHARK, product information sheet, Griffin Technology, [online], [retrieved Jun. 18, 2006]. Retrieved from the Internet <URL: http://www.griffintechnology.com/products/radioshark> 2 pages.

HD Radio® iTunes Tagging for HD Radio™ Broadcasting (Download.PDF) [online], [retrieved on Apr. 14, 2009]. Retrieved from the Internet <URL: www.ibiquity.com/broadcaster/itunes®tagging/intro> 4 pages.

HD Radio, Wikipedia Encyclopedia [online], [retrieved on Jan. 17, 2009]. Retrieved from the Internet <URL: http://en.wikipedia.org/wiki/HD_Radio> 9 pages.

Ibiquity Digital, An Advanced Application Services Framework for Application and Service Developers using HD Radio™ Technology, Technical White Paper, Feb. 1, 2003, [online], [retrieved on Dec. 12, 2012]. Retrieved from the Internet <URL: www.hd-radio.com/i/pdfs/SY_TN_5032_000.pdf> 11 pages.

Ibiquity Digital Corporation, HD Radio™ Data Network Requirements, Application Note, Rev.09, Oct. 23, 2006, [online], [retrieved Dec. 12, 2008]. Retrieved from the Internet <URL: http://www.ibiquity.com/i/HD%20Networking%20Requirements%20v9(1).pdf.

iBiquity Digital Corporation, IBOC DAB Field Test Platforms, by Grag A. Nease, [online], [retrieved on Dec. 12, 2008]. Retrieved from the Internet <URL: http://www.ibiquity.com/i/pdfs/Field_Test_Platforms.pdf> 14 pages.

Ibiquity Digital Corporation, iTunes® Tagging, Introductory Information for HD Radio Broadcasters, [online], [retrieved on Jan. 17, 2009]. Retrieved from the Internet <URL: http://www.ibiquity.com/broadcasters/tag> 3 pages.

iBiquity Digital, Emergency Alert System (EAS) Requirements for HD Radio™, Application Note Template, Rev.01, Nov. 28, 2006, [online], [retrieved Jan. 17, 2009]. Retrieved from the Internet <URL: www.hdradio.com/i/pdfs/EAS%20Paper_TX_TN_2089.pdf> 5 pages.

iBiquity Digital Corporation, HD Radio™ Networking Best Practices, MTM Technologies, prepared by Trieu Vu, Jul. 27, 2006, [online], [retrieved Dec. 12, 2008]. Retrieved from the Internet <URL: http://www.ibiquity.com/i/HD%20Networking%20Best%20Practices.pdf> 13 pages.

iBiquity Digital Corporation, HD Radio™ Networking Implementation Recommendations, MTM Technologies, prepared by Kurt VanderSluis, Jul. 27, 2006, [online], [retrieved Dec. 12, 2008]. Retrieved from the Internet <URL: http://www.ibiquity.com/i/HD%20Network%20Implementation%20Recommendations(1).pdf> 14 pages.

iBiquity Digital Corporation, The Structure and Generation of Robust Waveforms for AM in Band on Channel Digital Broadcasting, by Steve Johnson, [online], [retrieved on Dec. 12, 2008]. Retrieved from the Internet <URL: http://www.ibiquity.com/i/pdfs/Waveforms_AM.pdf> 10 pages.

iBiquity Digital Corporation, The Structure and Generation of Robust Waveforms for FM In-Band On-Channel Digital Broadcasting, by Paul J. Peyla, [online], [retrieved on Dec. 12, 2008]. Retrieved from the Internet <URL: http://www.ibiquity.com/i/pdfs/Waveforms_FM.pdf> 17 pages.

MacXM Features [online], [retrieved on Apr. 11, 2005]. Retrieved from the Internet <URL: http://macxm.sourceforge.net/features.html> 1 page.

MacXM Screenshots [online], [retrieved on Apr. 11, 2005]. Retrieved from the Internet <URL: http://macxm.sourceforge.net/shots.html> 2 pages.

MacXM FAQs [online], [retrieved on Apr. 11, 2005]. Retrieved from the Internet <URL: http://macxm.sourceforge.net/faq.html> 6 pages.

Macworld, Review: Apple iPod Radio Remote, Jan. 25, 2006, [online], [retrieved on Mar. 31, 2009]. Retrieved from the Internet <URL: http://www.macworld.com/article/49108/2006/01/ipodfrmremote.htlm> 5 pages.

National Radio Systems Committee, "In-Band/On-Channel Digital Radio Broadcasting Standard NRSC-5," Apr. 2005, Consumer Electronics Association and National Association of Broadcasters, [online], retrieved on Jan. 17, 2009]. Retrieved from the Internet <URL: http://www.nrscstandards.org.> 47 pages.

Radio Data System, Radio Electronics.com [online], retrieved Dec. 12, 2008]. Retrieved from the Internet <URL: http://www.radio-electronics.com/info/broadcast/rds/rds.php> 4 pages.

Radio Data System, Wikipedia Encyclopedia [online], retrieved Dec. 12, 2008]. Retrieved from the Internet <URL: http://en.wikipedia.org/wiki/Radio_Data_System> 6 pages.

Partial International Search for Application No. PCT/US2009/059841 mailed on Nov. 3, 2010; 6 pages.

Altec Lansing, "inMotion User Guide," Corp. Headquarters, 8 pages; © 2003, Milford, PA 18337.

"iPod Radio-Remote-Internals-1260.jpg;" Wikimedia Commons, The Free Media Repository; 4 pages; retrieved on Feb. 25, 2009; retrieved from the Internet at http://commons.wikimedia.org/wiki/File:%E7%94%BB%E5%83%8F-IPod-radio-remote-internals-1260.jpg.

"iPod Radio Remote" 14 pages; 2007 Apple Inc.; China.

U.S. Appl. No. 12/372,689, filed Feb. 17, 2009, Bolton et al.

* cited by examiner

TECHNIQUES FOR CONTROLLING A PORTABLE MEDIA DEVICE HAVING A RADIO FREQUENCY TUNER

CROSS-REFERENCES TO RELATED APPLICATIONS

The present application is related to the following commonly-owned U.S. patent applications, which are incorporated herein by reference in their entireties for all purposes:

(1) U.S. patent application Ser. No. 11/519,386, titled "METHOD AND SYSTEM FOR CONTROLLING AN ACCESSORY HAVING A TUNER," filed Sep. 11, 2006, now U.S. Pat. No. 7,441,058, issued Oct. 21, 2008;

(2) U.S. patent application Ser. No. 12/208,987, titled "METHOD AND SYSTEM FOR CONTROLLING AN ACCESSORY HAVING A TUNER," filed Sep. 11, 2008; and (3) U.S. patent application Ser. No. 12/372,689, titled "DIGITAL RADIO TAGGING USING AN RF TUNER ACCESSORY," filed Feb. 17, 2009.

BACKGROUND

The present disclosure relates in general to portable media devices that can interoperate with accessories, and in particular to interoperation of a portable media device with an accessory to facilitate control of a radio frequency (RF) tuner included in the portable media device.

Generally speaking, an RF tuner is a device that is capable of selecting, or "tuning in," radio signals at a specified frequency for conversion to another medium (e.g., audio, video, data, etc.). RF tuners are available for tuning in radio signals corresponding to various different types of broadcasts, such as radio and television (TV) broadcasts. The broadcasts can be encoded in analog or digital format. Examples of analog broadcasts include Frequency Modulation (FM) radio, Amplitude Modulation (AM) radio, and National Television Systems Committee (NTSC) TV broadcasts. Examples of digital broadcasts include HD Radio, satellite radio, Advanced Television Systems Committee (ATSC) TV, and Digital Video Broadcasting (DVB) TV broadcasts.

In recent years, there has been growing demand for the inclusion of RF tuning functionality in portable media devices. As used herein, a portable media device, or PMD, is a handheld device that is capable of storing and playing back digital media assets such as audio, video, and/or still image files. Some portable media devices, such as the iPod® and iPhone™ (both developed by Apple Inc., assignee of the present application), can provide users a variety of services in addition to media storage and playback. Examples of such services include the storage of personal data such as calendar, contacts, and notes; Internet access; mobile telephony; and the ability to selectively download and run various application programs.

Certain existing portable media devices have built-in FM tuners for tuning in analog FM radio stations. However, these built-in tuners are typically operated via an input interface located directly on the portable media device. Generally speaking, these built-in tuners cannot be controlled via separate accessory devices (also referred to herein as "accessories") that are capable of communicating user input to the portable media device. In addition, these existing built-in tuners are not designed to tune in digital radio (e.g., HD Radio, satellite radio) or digital TV (e.g., ATSC, DVB) broadcasts.

SUMMARY

Embodiments of the present invention facilitate interoperation between a portable media device having an RF tuner and an accessory device (or "accessory"). In certain embodiments, the portable media device and the accessory can exchange various commands pertaining to the capabilities, state, and/or operation of the tuner. For example, in one set of embodiments the accessory can send one or more commands requesting information about the capabilities of the tuner, and the portable media device can provide the requested capability information. In another set of embodiments, the accessory can send one or more commands requesting execution of a particular action with respect to the tuner (e.g., modification of a tuner setting), and the portable media device can perform the requested action. In this manner, certain embodiments of the present invention enable a user to control the tuner functionality of the portable media device via the accessory, rather than, e.g., via an input interface located directly on the portable media device.

In one set of embodiments, an accessory can send one or more first commands to a portable media device, where the one or more first commands request tuner capability information indicating one or more capabilities of a tuner included in the portable media device. The accessory can then receive one or more second commands from the portable media device, where the one or more second commands include the tuner capability information. The accessory can further send one or more third commands to the portable media device, where the one or more third commands include tuner control information for controlling the tuner.

In one set of embodiments, the tuner included in the portable media device can be configured to tune in analog and/or digital radio broadcasts. In another set of embodiments, the tuner included in the portable media device can be configured to tune in analog and/or digital TV broadcasts. The broadcasts can originate from terrestrial and/or satellite sources.

As used herein, "sending a command" or "receiving a command" is to be interpreted broadly to include any signaling regime where a signal specifying an action and/or including information is sent or received. The signal can be received and interpreted by hardware (e.g., combinatorial logic), software executing on a processor, or a combination of hardware and software.

Additionally, sending and/or receiving a command is to be interpreted broadly to include engaging in an exchange of commands. Thus, while the term "command" is sometimes used for a low-level atomic transaction, it can also be used to refer to high-level operations that include multiple low-level commands.

A further understanding of the nature and advantages of embodiments of the present invention may be realized by reference to the remaining portions of the specification and the drawings.

DETAILED DESCRIPTION

In the following description, for the purposes of explanation, numerous details are set forth in order to provide an understanding of various embodiments of the present invention. It will be apparent, however, to one skilled in the art that certain embodiments can be practiced without some of these details.

Embodiments of the present invention facilitate interoperation between a portable media device having an RF tuner and an accessory. In certain embodiments, the portable media device and the accessory can exchange various commands pertaining to the capabilities, state, and/or operation of the tuner. For example, in one set of embodiments the accessory can send one or more commands requesting information about the capabilities of the tuner, and the portable media device can provide the requested capability information. In another set of embodiments, the accessory can send one or more commands requesting execution of a particular action with respect to the tuner (e.g., modification of a tuner setting), and the portable media device can perform the requested action. In this manner, certain embodiments of the present invention enable a user to control the tuner functionality of the portable media device via the accessory, rather than, e.g., via an input interface located directly on the portable media device.

Figure 1:
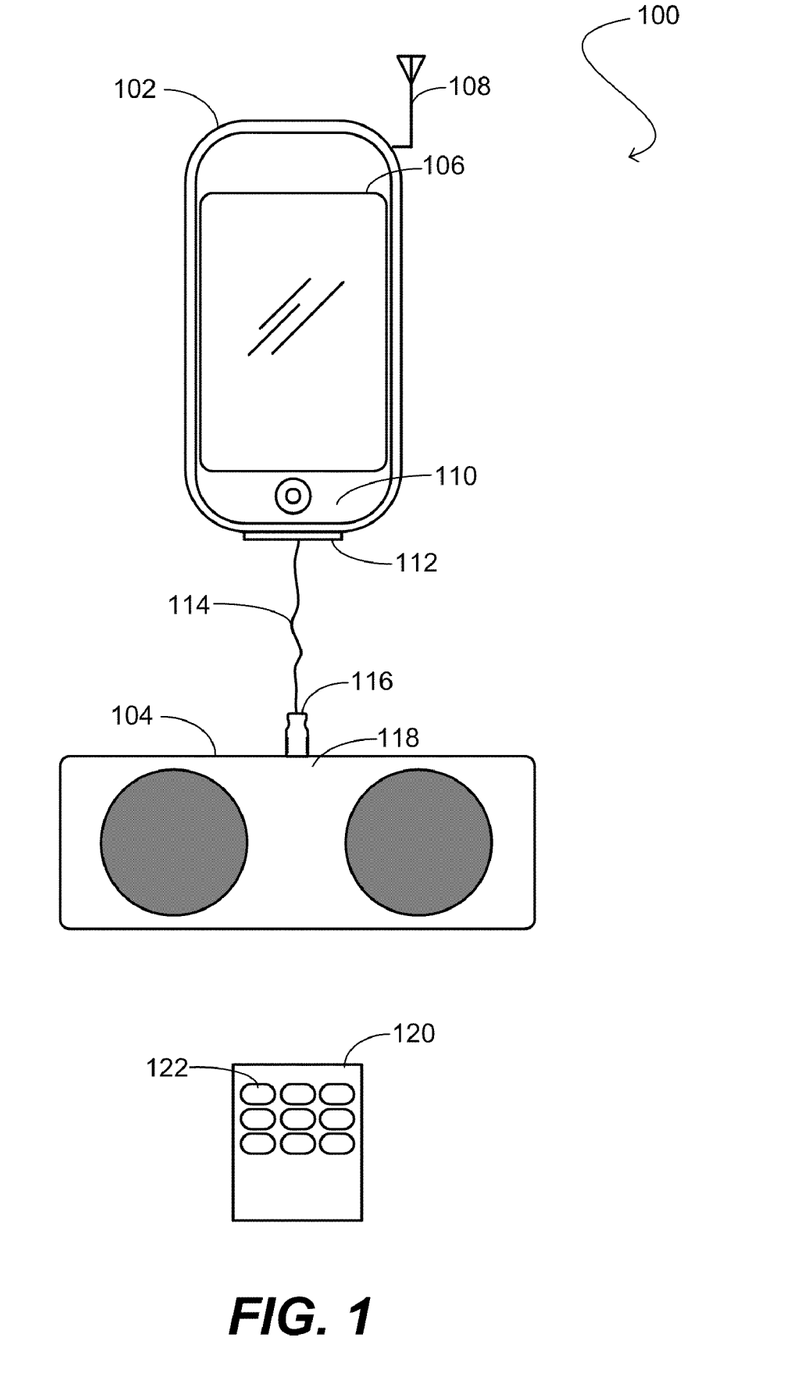
FIG. 1 is a simplified illustration of a system according to an embodiment of the present invention.

FIG. 1 is a simplified illustration of a system 100 according to an embodiment of the present invention. System 100 includes a portable media device (PMD) 102 communicatively coupled with an accessory 104. As described above, PMD 102 can be any handheld device that is capable of storing and playing back digital media assets such as audio, video, and/or still image files. In a particular embodiment, PMD 102 can be an iPod® or iPhone™ (both developed by Apple Inc., assignee of the present application). PMD 102 can include a user interface comprising user input and/or output devices such as touch-screen display 106. PMD 102 can also include any number of other user input and/or output devices such as scroll wheels, buttons, keyboards, trackballs, touchpads, microphones, speakers, and the like.

PMD 102 can provide a variety of services to a user, such as the management and playback of media assets, mobile telephony and Internet access (e.g., via wireless connections such as Wi-Fi and/or advanced wireless data networks using EDGE or 3G technology), and execution of various application programs that can be installed on PMD 102 by the user. In certain embodiments, PMD 102 can provide an RF tuner application that enables a user to select and listen to/watch various radio and/or TV broadcasts. Some of the services provided by PMD 102 may call for user input that can be provided via an input device located directed on PMD 102 (e.g., touch-screen display 106), or via a connected accessory (e.g., accessory 104).

To enable the reception of radio and/or TV broadcasts, in certain embodiments PMD 102 can incorporate an RF antenna 108 and supporting RF tuner circuitry (not explicitly shown). RF antenna 108 and the RF tuner can be capable of receiving terrestrial and/or satellite signals in any RF band (e.g., AM, FM, and satellite bands). Further, RF antenna 108 and the RF tuner can be capable of receiving analog (e.g., FM radio, AM radio, NTSC, etc.) and/or digital (e.g., HD Radio, satellite radio, ATSC, DVB, etc.) broadcasts. While antenna 108 is shown as being external to PMD 102, it is to be understood that this is not required, and antenna 108 can be internal to PMD 102. In some embodiments, antenna 108 can be an attachable device and can also provide dual functions. For example, an antenna input port can be incorporated into a headphone jack, allowing a user to insert a connection to any suitable antenna. In some embodiments, a headphone wire can be leveraged as an antenna to improve reception of radio signals.

As shown, PMD 102 can include a PMD connector 110 that can receive an end connector 112 of a cable 114. PMD connector 110 can include a number of pins assigned to carry various data and control signals between PMD 102 and accessory 104. In one set of embodiments, PMD connector 110 can include pins for carrying audio signals in digital and/or analog format from PMD 102 to accessory 104 (or vice versa) and control signals as described below for facilitating control of the RF tuner included in PMD 102.

In further embodiments, PMD connector 110 can include pins for providing electrical power and ground connections between PMD 102 and accessory 104. In a particular embodiment, a certain pin (or pins) can be assigned to deliver power from PMD 102 to accessory 104 while another pin (or pins) can be assigned to deliver power from accessory 104 to PMD 102. Thus, either device (102 or 104) can provide power to the other.

Accessory 104 can receive the other end connector 116 of cable 114 at an accessory connector 118. In some embodiments, accessory connector 118 can have a different form factor and/or different number of contacts from PMD connector 110. In other embodiments, the two connectors can be the same. In still other embodiments, accessory connector 118 can be designed to mate directly with PMD connector 110 such that cable 114 is not required. In further embodiments, some or all communication between PMD 102 and accessory 104 may take place wirelessly (e.g., via Bluetooth or other short-range wireless protocols).

Accessory 104 can be a speaker system (as shown), a dock, a combination speaker/dock, or any other type of electronic device that is capable of exchanging signals with PMD 102. In an embodiment where accessory 104 is a speaker system (or includes some type of audio output device), radio broadcasts received by PMD 102 can be played for a user via accessory 104. In an embodiment where accessory 104 includes a display device, TV broadcasts received by PMD 102 can be played for a user via accessory 104.

Although not shown, accessory 104 can include additional components that provide services or service enhancements to PMD 102. Merely by way of example, accessory 104 can include audio/video ("A/V") out ports that enable A/V signals to be routed from PMD 102 (e.g., via cable 114) to an external display/playback device. Accessory 104 can also include user input and/or output devices, such as scroll wheels, buttons, keyboards, trackballs, touchpads, microphones, speakers, touch-screen displays, and the like for providing user input to, and/or presenting information from, PMD 102.

In one set of embodiments, accessory 104 can communicate wirelessly with a remote control 120 via, e.g., infrared signaling or other short-range wireless signals. Remote control 120 can include a number of control buttons 122 that allow a user to communicate instructions to accessory 104. Accessory 104 can relay these instructions to PMD 102, thereby allowing a user to control radio/TV playing and/or other functions of PMD 102. Merely by way of example, remote control 120 can provide buttons for volume control, buttons for changing the current station/channel, buttons for enabling/disabling radio/TV playback, and buttons that can be associated with preset radio stations and/or TV channels the user likes. In some embodiments, accessory 104 can receive user input directly via an input interface located directed on the accessory (not explicitly shown), in addition to or instead of receiving input from remote control 120.

It should be appreciated that system 100 is illustrative and that variations and modifications are possible. For example, PMD 102 can be made in a variety of form factors and configurations and may be able to receive radio and/or TV broadcasts in a variety of formats (including analog, digital, and hybrid digital) from a variety of sources (including terrestrial and satellite transmitters). In addition, in some embodiments PMD 102 may be able to stream broadcast content from a data network such as the Internet. Further, accessory 104 is just one example of a range of accessories to which PMD 102 can be connected; as described above, the term "accessory" can includes any electronic device capable of communicating control signals and information with a PMD. Examples of such communication are described below.

Figure 2:
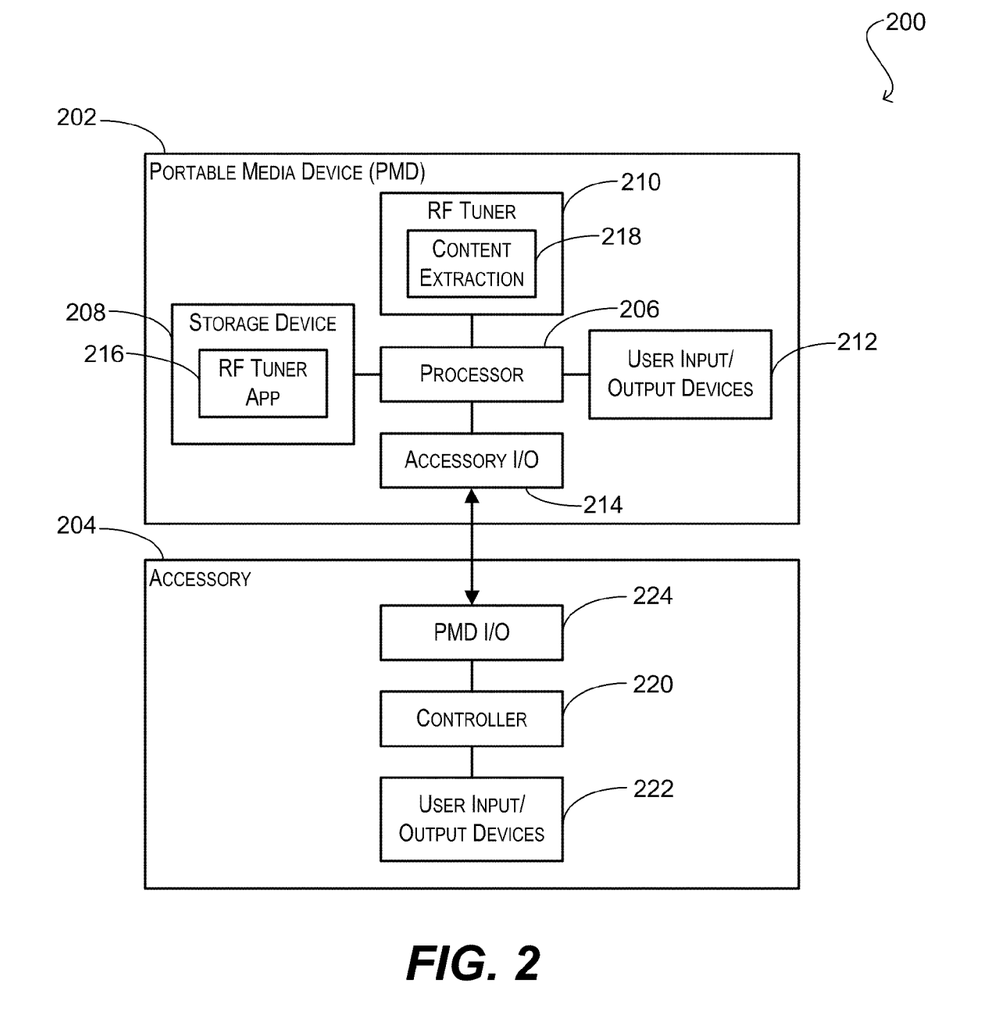
FIG. 2 is a simplified block diagram of a system according to an embodiment of the present invention.

FIG. 2 is a simplified block diagram of a system 200 according to an embodiment of the present invention. System 200 includes a PMD 202 (e.g., implementing PMD 102 of FIG. 1) and an accessory 204 (e.g., implementing accessory 104 of FIG. 1).

PMD 202 can include a processor 206, a storage device 208, an RF tuner 210, user input/output devices 212, and an accessory I/O (input/output) interface 214. Although not shown, PMD 202 can also include other components to provide various enhanced capabilities. For example, in some embodiments PMD 202 can include transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), a GPS receiver, and/or other components.

Processor 206 can be implemented as one or more integrated circuits, such as a microprocessor or microcontroller. In some embodiments, processor 206 can be a microprocessor that uses the ARM architecture (a RISC architecture designed by ARM Limited). Processor 206 can be responsible for carrying out one or more functions of PMD 202. For example, processor 206 can select and play media assets or execute various application programs stored in storage device 208. Processor 206 can also manage communication with accessory devices (e.g., accessory 204) via accessory I/O interface 214. As described in further detail below, in one set of embodiments processor 206 can execute a radio application such as radio application 216 that allows for radio playback.

Storage device 208 can be implemented, for example, using magnetic disk, flash memory, and/or any other nonvolatile storage medium. In some embodiments, storage device 208 can include non-removable storage components such as a non-removable hard disk drive or flash memory drive. In other embodiments, storage device 208 can include removable storage media such as flash memory cards. Storage device 208 can provide storage for any programs and/or data used by PMD 202. For example, storage device 208 can store media assets such as audio, video, still images, or the like, and associated metadata (e.g., asset name, artist, title, genre, playlists, etc.). Storage device 208 can also store information other than media assets, such as information about a user's contacts (names, addresses, phone numbers, etc.); scheduled appointments and events; notes; and/or other personal information. In still other embodiments, storage device 208 can store one or more programs to be executed by processor 206, such as video game programs, personal information management programs, programs for playing media assets and/or navigating a media asset database, and so on.

In one set of embodiments, storage device 208 can store an RF tuner application program 216 that allows a user to listen to radio programming or watch TV programming via the RF tuner functionality of PMD 202. For example, RF tuner application 216 can define a user interface that allows a user to select a radio station and/or TV channel, to control volume and other characteristics of the sound and/or video, and to capture identifying information about currently playing content. In some embodiments, when RF tuner application 216 is active, a PMD-specific protocol can be used to pass commands and data between PMD 202 and accessory 204 for controlling RF tuner 210. A representative set of such commands is described in further detail below.

In certain embodiments, storage device 208 can further store radio-related and/or TV-related metadata, such as information relating to favorite station frequencies and/or channels, or metadata accompanying analog and/or digital programming (e.g., Radio Data System (RDS)/Radio Broadcast Data System (RBDS) metadata, Station Information Service (SIS) metadata, Program Service Data (PSD) metadata, digital TV (e.g., ATSC, DVB) metadata, etc.).

RF tuner 210 can be used to receive broadcasts via one or more media; any broadcast medium or combination of media can be supported. For example, RF tuner 210, in conjunction with a suitable antenna (not explicitly shown), can be capable of detecting broadcasts via a wireless medium (e.g., FM or AM radio in analog and/or digital/HD formats, over-the-air TV, satellite TV or radio, WiFi, cellular communication network, etc.). RF tuner 210 may include any hardware and/or software elements usable to extract broadcast data from wired and/or wireless media as desired; the particular components will depend on the medium (or media) supported. Any combination or sub-combination of wired and/or wireless media can be supported.

RF tuner 210 can include a content extraction engine 218, which can incorporate appropriate decoding and processing components to extract audio and/or video signals from a received broadcast; these components can generate analog and/or digital signals suitable for driving video and/or audio output devices, such as display devices and/or speakers. In certain embodiments, such output devices can be components of user input/output devices 212. In addition or instead, PMD 202 can deliver these signals to accessory 204 via, e.g., accessory I/O interface 214.

In embodiments where RF tuner 210 is configured to tune in to a digital radio broadcast, content extraction engine 218 can extract digital audio data and/or digital metadata from the received signal. Examples of digital metadata formats that can be embedded in digital broadcasts include SIS and PSD, which are based on IBOC Digital Radio Broadcasting Standard NRSC-5 or NRSC-5A. In certain embodiments, the digital audio data can be converted to analog format prior to being sent to an output device (e.g., speakers) or an output interface (e.g., accessory I/O interface 214, dedicated audioout port, etc.) of PMD 202.

In embodiments where RF tuner 210 is configured to tune in to a digital TV broadcast, content extraction engine 218 can extract digital audio/video data and/or digital metadata from the received signal. An example a digital metadata format that can be embedded in a digital TV broadcast is defined in ATSC Standard: Program and System Information Protocol for Terrestrial Broadcast and Cable (Revision C) With Amendment No. 1. In certain embodiments, the digital audio/video data can be decoded and converted to analog format prior to being send to an output device (e.g., speakers, display) or an output interface (e.g., accessory I/O interface 214) of PMD 202.

In embodiments where RF tuner 210 is configured to tune in to an analog radio broadcast, content extraction engine 218 can extract analog audio data and/or digital metadata from the received signal. Examples of digital metadata formats that can be embedded in conventional analog broadcasts include RDS and RBDS.

User input/output devices 212 can be any of a number of devices that allow a user to interact with PMD 202. As discussed with respect to PMD 102 of FIG. 1, such user input/output devices can include scroll wheels, buttons, keyboards, trackballs, touchpads, microphones, speakers, touch-screen displays, and so on. In various embodiments, the user can operate a particular user input device 212 to invoke the functionality of PMD 202. In addition, a user can view and/or hear output from PMD 202 (e.g., broadcasts received via RF tuner 210) via a particular user output device 212.

Accessory I/O interface 214 can include a number of signal paths configured to carry various signals between PMD 202 and accessory 204. In one set of embodiments, accessory I/O interface 214 includes a 30-pin connector corresponding to the connector used on the iPod® and iPhone™. The 30-pin connector can provide connections for power and ground as well as for various wired communication interfaces such as USB, FireWire, and/or universal asynchronous receiver/transmitter (UART). In addition or instead, accessory I/O interface 214 can include a wireless interface such as Bluetooth (i.e., an interface compliant with a Bluetooth® specification (e.g., Bluetooth specification v2.1+ EDR; other versions can also be used) promulgated by the trade association Bluetooth SIG, Inc. (headquartered in Bellevue, Wash.)). Other wireless protocols can also be supported. Thus, accessory I/O interface 214 can support multiple communication channels including wired and/or wireless channels, and a given accessory can use any or all of these channels.

Accessory 204 can include a controller 220, user input/output devices 222, and a PMD I/O interface 224. Accessory 204 is representative of a broad range of electronic devices to which PMD 202 can be connected, and it is understood that such devices can vary widely in capability, complexity and form factor. Various accessories may include components not shown in FIG. 2, including but not limited to storage devices (disk, memory, etc.), ports for connecting to external speakers and/or display devices, and so on.

Controller 220 can be implemented as one or more integrated circuits, such as a microprocessor or microcontroller. In various embodiments, controller 220 can execute program code to perform various functions associated with accessory 204. For example, in some embodiments where accessory 220 incorporates a sound system (e.g., speaker system 104 shown in FIG. 1), program code executed by controller 220 can include programs for digital audio decoding, analog or digital audio processing, and the like. Controller 220 can also manage communication with PMDs (e.g., PMD 202) via PMD I/O interface 224.

User input/output devices 222 can be any of a number of devices that allow a user to interact with accessory 204. For example, such user input/output devices can include scroll wheels, buttons, keyboards, trackballs, touchpads, microphones, speakers, touch-screen displays, and so on. A user can operate input/output devices 222 to invoke the functionality of accessory 204 and to view and/or hear output from accessory 204. For example, in one set of embodiments a user can operate an input device 222 to remotely control RF tuner 210 included in PMD 202. In some embodiments, user input/output devices 222 can include a wireless (e.g., infrared) receiver that receives control signals from a remote control (e.g., remote control 120 of FIG. 1).

PMD I/O interface 224 can include a number of signal paths configured to carry various signals between accessory 204 and PMD 202. In one set of embodiments, PMD I/O interface 224 includes a 30-pin connector corresponding to the connector used on the iPod® and iPhone™. Alternatively or additionally, PMD I/O interface 224 can include a different connector or a wireless interface (e.g., Bluetooth or the like).

It should be appreciated that system 200 is illustrative and not intended to limit embodiments of the present invention. For example, PMD 202 and accessory 204 may each have other capabilities or include other components that are not specifically described. One of ordinary skill in the art will recognize many variations, modifications, and alternatives.

Accessory I/O interface 214 of PMD 202 and PMD I/O interface 224 of accessory 204 allow PMD 202 to be connected to accessory 204 and subsequently disconnected from accessory 204. As used herein, PMD 202 and accessory 204 are "connected" whenever a communication channel is open between PMD I/O interface 224 and accessory I/O interface 214. Such connection can be achieved via direct physical connection, e.g., with mating connectors; indirect physical connection, e.g., via a cable; and/or wireless connection, e.g., via Bluetooth.

In one set of embodiments, PMD 202 and accessory 204 can communicate by exchanging commands and data according to a PMD-specific protocol. The commands and data can be communicated, e.g., using any wired or wireless transport medium provided by accessory I/O interface 214 and PMD I/O interface 224 of FIG. 2. According to one aspect, the PMD-specific protocol can define a format for messages transmitted between PMD 202 and accessory 204. For instance, the protocol can specify that each message (also referred to herein as a command) is sent in a packet with a header and an optional payload. The header can provide basic information such as a start indicator, length of the packet, and a command to be processed by the recipient. The payload can provide data associated with the command. In some embodiments, the amount of associated data can be different for different commands, and some commands may provide for variable-length payloads. In some embodiments, the commands can be defined such that any particular command code is valid in only one direction. The packet can also include error-detection or error-correction codes as known in the art.

According to another aspect, the PMD-specific protocol can define a number of "lingoes," where a "lingo" refers generally to a group of related commands that can be supported (or unsupported) by various classes of accessories. In one set of embodiments, a command can be uniquely identified by a first byte identifying the lingo to which the command belongs and a second byte identifying the particular command within the lingo. Other command structures may also be used. It is not required that all accessories, or all PMDs to which an accessory can be connected, support every lingo defined within the protocol or every command of a particular lingo (for instance, different devices might use different versions of a given lingo).

In one set of embodiments, the PMD-specific protocol can include a general lingo that enables certain core communication functions between PMD 202 and accessory 204. For example, the general lingo can include commands enabling PMD 202 and accessory 204 to identify themselves to each other and to provide information about their respective capabilities, including which (if any) other lingoes each supports and which capabilities of the other device each intends to use while connected. The general lingo can also include authentication commands that PMD 202 can use to verify the purported identity and capabilities of accessory 204 (or vice versa). In some cases, accessory 204 (or PMD 202) can be blocked from invoking certain commands or lingoes if the authentication is unsuccessful.

In some embodiments, the general lingo can also provide a notification capability. For example, PMD 202 can generate notifications in response to various events that change the status of PMD 202, such as launching or exiting various applications (e.g., radio application 216), changing state within an application (e.g., when a new track begins playing during a radio broadcast), and so on. Accessory 204, when connected to PMD 202, can "register" to receive all notifications or selected classes of notifications by sending a registration command to PMD 202. Once accessory 204 has registered for a particular class (or classes) of notifications, PMD 202 automatically begins to send notifications to accessory 204 whenever any event within the registered class(es) occurs. Notification conveniently allows accessory 204 to maintain current information about the status of PMD 202 without having to send requests for status information.

The PMD-specific protocol can also include various other lingoes, such as a simple remote lingo that allows accessory 204 to send a command indicating a function of PMD 202 to be invoked, a remote user interface lingo that can be used to communicate commands and data related to replicating all or part of a user interface of PMD 202 on accessory 204 (thereby supporting a more advanced remote control), a storage lingo that allows accessory 204 to store data on PMD 202 (or vice versa), and so on. In one set of embodiments, the PMD-specific protocol can include an RF tuner lingo that allows a user to control an RF tuner (e.g., RF tuner 210) in PMD 202 by operating accessory 204 (described in greater detail with respect to FIGS. 3 and 4 below). In this manner, a user can control the tuner functionality of PMD 202 via accessory 204, rather than, e.g., via an input interface located directly on PMD 202.

Figure 3:
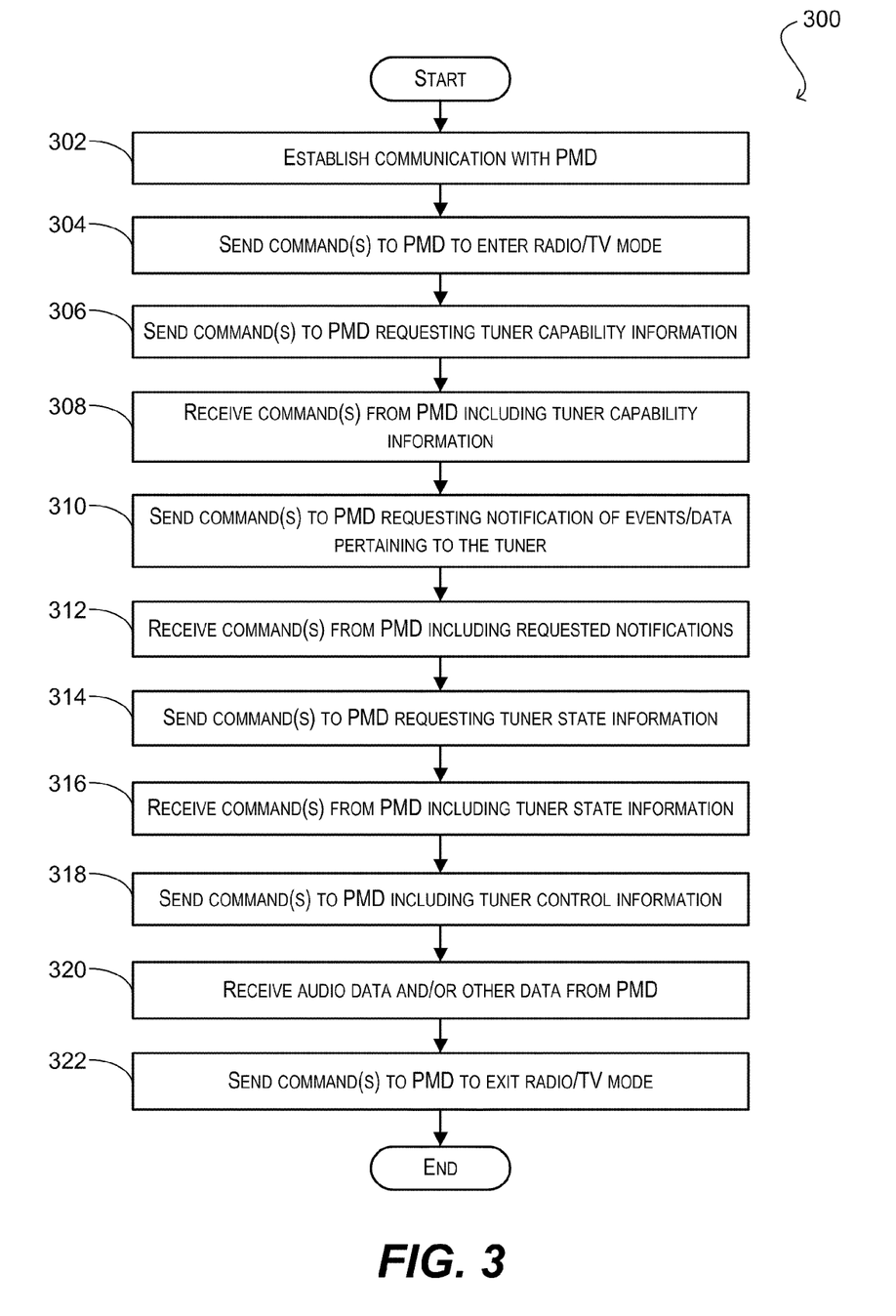
FIG. 3 is a flow diagram of a process performed by an accessory for interoperating with a portable media device having an RF tuner according to an embodiment of the present invention.

FIG. 3 is a flow diagram illustrating a process 300 performed by an accessory (e.g., accessory 204) for interoperating with a portable media device having an RF tuner (e.g., PMD 202) according to an embodiment of the present invention. Process 300 can be implemented by accessory 204 in hardware, software, or a combination thereof. As software, process 300 can be encoded as program code stored on a machine-readable storage medium.

Process 300 begins when accessory 204 establishes communication with PMD 202 (block 302). In one set of embodiments, this can include identifying and authenticating PMD 202 using the general lingo of the PMD-specific protocol described above.

At block 304, accessory 204 can send a command to PMD 202 indicating that a user wishes to start listening to the radio or watching TV. Examples of such commands include EnterRadioMode and EnterTVMode. In certain embodiments, PMD 202 can respond to the EnterRadioMode or EnterTVMode command by launching RF tuner application 216 and exiting any other currently-running audio/video playback applications (e.g., a media playback application for playing back stored media assets).

At block 306, accessory 204 can send one or more commands to PMD 202 requesting information about the capabilities of RF tuner 210. An example of such a command is GetTunerCaps. In one set of embodiments, the GetTunerCaps command can specify particular tuner features that accessory 204 is interested in, such as the types of bands the tuner supports (e.g., FM band, AM band, etc.), the resolution the tuner supports for each band, the types of controls the tuner supports (e.g., seek, next station, previous station, next channel, previous channel, etc.), and/or the types of modes the tuner supports (e.g., force monophonic mode, stereo blend mode, etc.). In other embodiments, the GetTunerCaps command can simply request information about all of the available capabilities of RF tuner 210.

In response to sending the GetTunerCaps command, accessory 204 can receive one or more commands from PMD 202 including the requested tuner capability information (block 308). An example of such a command is RetTunerCaps. In an embodiment where RF tuner 210 is a radio tuner, the RetTunerCaps command can include a data field including values for, e.g., FM band U.S., HD radio capable, tuner power control capable, status change notification capable, FM resolution, tuner seek capable, tuner seek RSSI threshold capable, force monophonic mode capable, stereo blend capable, FM tuner deemphasis select capable, AM resolution, RDS/RBDS data capable, tuner channel RSSI indication capable, stereo source indicator capable, and so on.

In certain embodiments, accessory 204 can store the received tuner capability information locally for future reference. In further embodiments, accessory 204 can output, based on the tuner capability information, one or more indications to a user (via, e.g., output device 222) about the presence and/or absence of certain tuner features.

At block 310, accessory 204 can send one or more commands to PMD 202 requesting notification of status changes or desired types of data pertaining to the tuner. Examples of such commands include SetStatusNotifyMask, SetRdsNotifyMask, and SetHDDataNotifyMask. The SetStatusNotifyMask command can include a bitmask identifying specific status changes in RF tuner 210 that should invoke a notification command from PMD 202 to accessory 204. For instance, the bitmask can specify that a notification should be generated whenever a new audio track or new TV program begins playing during a broadcast.

The SetRdsNotifyMask and SetHDDataNotifyMask commands can include bitmasks identifying specific types of broadcast metadata received via RF tuner 210 that should invoke a notification command from PMD 202 to accessory 204. In certain embodiments, the SetRdsNotifyMask command can apply to RDS/RBDS metadata received in analog radio broadcasts, and the SetHDDataNotifyMask command can apply to SIS and/or PSD metadata received in digital/HD radio broadcasts.

Once accessory 204 has registered for notifications via the commands sent at block 310, accessory 204 can receive one or more commands asynchronously from PMD 202 reporting the requested notifications (block 312). For example, in response to the SetStatusNotifyMask command, accessory 202 can receive a StatusChangeNotify command from PMD 202 upon the occurrence of a specified status change. As another example, in response to the SetRdsNotifyMask or SetHDDataNotifyMask commands, accessory 204 can receive an RdsReadyNotify or HDDataReadyNotify command from PMD 202 when the specified types of RDS/RBDS or SIS/PSD metadata are received via RF tuner 210 respectively.

In some embodiments, upon receiving the RdsReadyNotify or HDDataReadyNotify command, accessory 204 can request that PMD 202 send the metadata via a GetRdsData or GetHDData command. In response, accessory 204 can receive a RetRdsData or RetHDData command from PMD 202 including the requested metadata.

At block 314, accessory 204 can send one or more commands to PMD 202 requesting information about the state and/or status of RF tuner 210. Examples of such commands include GetTunerBand, GetTunerFreq, GetTunerStatus, GetHDProgramService, GetHDProgramServiceCount, GetStatusNotifyMask, GetRdsNotifyMask, GetHDDataNotifyMask, GetRdsReadyStatus, and GetHDDataReadyStatus. The GetTunerBand command can request the tuner's current RF band setting (e.g., AM or FM). The GetTunerFreq command can request the tuner's current frequency setting (e.g., 87.5 MHz). In certain embodiments, the tuner frequency can be expressed in kilohertz, e.g., 87500 for 87.5 MHz. The GetTunerStatus command can request the tuner's current status, such as power level, received signal strength, operating modes, etc.

In embodiments where RF tuner 210 supports the tuning of digital/HD Radio broadcasts, the GetHDProgramService command can request the currently tuned HD Radio program. Further, the GetHDProgramServiceCount command can request a count of HD Radio Programs broadcast at the current tuner frequency.

In embodiments where RF tuner 210 supports the tuning of digital TV (e.g., ATSC, DVB) broadcasts, the GetHDProgramService command can request the currently tuned sub-channel (or minor channel) for a major channel. Further, the GetHDProgramServiceCount command can request a count of sub-channels for the major channel.

The GetStatusNotifyMask, GetRdsNotifyMask, and GetHDDataNotifyMask commands can request the current bitmasks set in PMD 202 via previous invocations of the SetStatusNotifyMask, SetRdsNotifyMask, and SetHDDataNotifyMask commands. The GetRdsReadyStatus and GetHDDataReadyStatus commands can be used by accessory 204 to manually check whether specific types of RDS/RBDS metadata or SIS/PSD metadata have been received at PMD 202 via RF tuner 210 (rather than waiting for notifications from PMD 202).

In response to sending the commands described above at block 314, accessory 204 can receive one or more commands from PMD 202 including the requested tuner state information (block 316). Examples of such commands include RetTunerBand, RetTunerFreq, RetTunerStatus, RetHDProgramService, RetHDProgramServiceCount, RetStatusNotifyMask, RetRdsNotifyMask, RetHDDataNotifyMask, RetRdsReadyStatus, and RetHDDataReadyStatus. In various embodiments, these commands can include the information requested by their complementary "Get" commands respectively. Like the capability information described above, in certain embodiments accessory 204 can output information about the tuner's state to a user via, e.g., output device 222.

At block 318, accessory 204 can send one or more commands to PMD 202 including information for controlling, or changing one or more settings of, RF tuner 210. Examples of such commands include SetTunerCtrl, SetTunerMode, SetTunerBand, SetTunerFreq, SetTunerSeekRssi, TunerSeekStart, and SetHDProgramService. The SetTunerCtrl command can include data for modifying various control parameters used by RF tuner 210, such as a power parameter for turning the tuner on or off and a notification parameter for turning the notification feature on or off. The SetTunerMode command can include data for enabling or disabling certain modes of operation of RF tuner 210. For example, the SetTunerMode command can include a data field specifying FM tuner resolution 200 kHz, stereo allowed, no stereo blend, FM tuner deemphasis 75 µs, and AM tuner resolution 10 kHz.

The SetTunerBand command can include data specifying a tuner band to set, such as FM U.S. band. The SetTunerFreq command can include data specifying a frequency to be tuned, such as 87.5 Mhz.

The SetTunerSeekRssi command can include data specifying a desired RSSI threshold value. In certain embodiments, the RSSI threshold value indicates a threshold amount of power that must be present at a specific frequency in order for RF tuner 210 to tune in to that frequency during a seek operation. The TunerSeekStart command can instruct RF tuner 210 to begin a seek operation. In some embodiments, the TunerSeekStart command can include data specifying one of several types of seeks to perform. The types of seeks can include:

Seeking up from beginning of band using or not using the RSSI threshold value;

Seeking down from end of band using or not using the RSSI threshold value;

Seeking up from the current frequency using or not using the RSSI threshold value;

Seeking down from the current frequency using or not using the RSSI threshold value;

Seeking up from beginning of band for an HD Radio signal using or not using the RSSI threshold value;

Seeking down from end of band for an HD Radio signal using or not using the RSSI threshold value;

Seeking up from the current frequency for an HD Radio signal using or not using the RSSI threshold value; and Seeking down from the current frequency for an HD Radio signal using or not using the RSSI threshold value.

In one set of embodiments, a seek operation using the RSSI threshold value can complete when either of the following two conditions is satisfied:

A channel was located within the band that satisfies the RSSI threshold value; or No channel was located within the band that satisfies the RSSI threshold value. The seek has traversed the entire band and wrapped back to the beginning tuner frequency without locating a valid channel. If no channel is found, it may indicate that the threshold is too high for the current radio reception area.

In one set of embodiments, a seek operation not using the RSSI threshold value can complete when either of the following two conditions is satisfied:

A channel was located within the band that satisfies the criteria of the tuner's seek function. This may result in moving one or more channel spacings and wrapping around at the band ends.

No channel was located within the band that satisfies the criteria of the tuner's seek function. The seek has traversed the entire band and wrapped back to the beginning tuner frequency without locating a valid channel.

In one set of embodiments, an HD Radio seek operation skips non-HD channels and stops only on channels with HD Radio signals present. The seek can complete when either of the following two conditions is satisfied:

An HD Radio channel was located within the band that satisfies the criteria of the tuner's seek function. This may result in moving one or more channel spacings and wrapping around at the band ends.

No HD Radio channel was located within the band that satisfies the criteria of the tuner's seek function. The seek has traversed the entire band and wrapped back to the beginning tuner frequency without locating a valid HD Radio channel.

In certain embodiments, accessory 202 can receive a TunerSeekDone command from PMD 202 upon completion of a seek operation. The TunerSeekDone command can include data specifying the tuned frequency and the current station's RSSI value.

In embodiments where RF tuner 210 supports the tuning of digital/HD Radio broadcasts, the SetHDProgramService command can include data specifying a desired HD Radio program at a specific frequency. In response to receiving the SetHDProgramService command, RF tuner 210 can tune to the desired HD Radio program. In one set of embodiments, the command can include a setting that disables all audio decoding and output by PMD 202. This enables PMD 202 to retrieve information for all available HD Radio programs prior to selecting a particular program's audio to be decoded and output.

In embodiments where RF tuner 210 supports the tuning of digital TV (e.g., ATSC, DVB) broadcasts, the SetHDProgramService command can include data specifying a desired digital TV program at a specific sub-channel. In response to receiving the SetHDProgramService command, RF tuner 210 can tune to the desired digital TV program.

Although not shown in FIG. 3, in some embodiments the tuner control information that is sent by accessory 204 at block 318 can be based on the tuner capability, tuner state, and/or notification information received at blocks 308, 312, and 316 respectively. For example, the accessory's sending of a tuner control command can be enabled by the accessory having previously obtained information from PMD 202 that RF tuner 210 (or PMD 202) has the requisite capability to support the command. Similarly, the accessory's sending of a tuner control command can be disabled by the accessory having previously obtained information from PMD 202 that RF tuner 210 (or PMD 202) does not have the requisite capability to support the command. In certain embodiments, if accessory 204 sends a tuner control command at block 318 that is not supported by RF tuner 210 or PMD 202, accessory 204 can receive a command from PMD 202 indicating that the control command cannot be processed.

At block 320, accessory 204 can receive audio and/or video data from PMD 202 generated from a broadcast received via RF tuner 210. In embodiments where the broadcast is an analog radio broadcast, accessory 204 can receive analog audio signals from PMD 202. In embodiments where the broadcast is a digital radio broadcast (e.g., HD Radio, satellite radio, etc.), accessory 204 can receive digital and/or analog audio signals from PMD 202. In embodiments where the broadcast is an analog TV broadcast, accessory 204 can receive analog audio/video signals from PMD 202. In embodiments where the broadcast is a digital TV broadcast (e.g., ATSC, DVB), accessory 204 can receive digital and/or analog audio/video signals from PMD 202. Accessory 204 can also receive other types of data, such as metadata included in the broadcast. Examples of such metadata include RDS/RBDS metadata (in the case of an analog radio broadcast) and SIS or PSD metadata (in the case of a digital/HD radio broadcast). In these embodiments, accessory 204 can output the received metadata to a user via an output device of the accessory (e.g., output device 222).

At block 322, accessory 204 can send a command to PMD 202 indicating that the PMD should exit radio/TV mode. Examples of such commands include ExitRadioMode and ExitTVMode. In one set of embodiments, the ExitRadioMode or ExitTVMode command can be sent in response to a user entering an input signal via the accessory indicating that the user no long wishes to listen to the radio or watch TV. If the ExitRadioMode or ExitTVMode command is not sent, accessory 204 can continue to receive/send commands and/or data per blocks 306-320 until, e.g., PMD 202 and accessory 204 become disconnected, or until PMD 202 decides to exit radio/TV mode.

Figure 4:
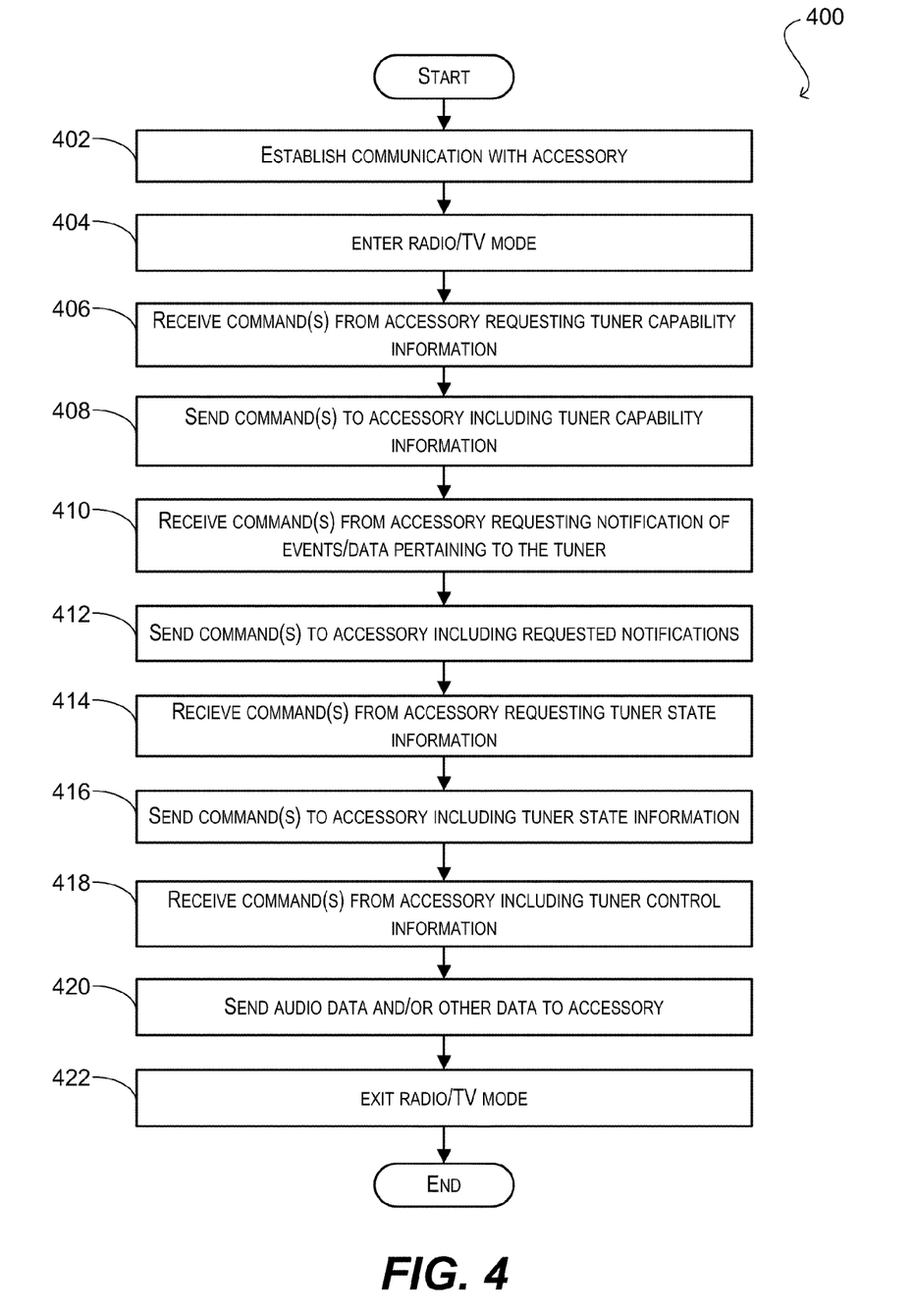
FIG. 4 is a flow diagram of a process performed by a portable media device having an RF tuner for interoperating with an accessory according to an embodiment of the present invention.

FIG. 4 is a flow diagram of a process 400 performed by a portable media device having an RF tuner (e.g., PMD 202) for interoperating with an accessory (e.g., accessory 204) according to an embodiment of the present invention. In one set of embodiments, process 400 can be performed by PMD 202 while process 300 is being performed by accessory 204. Process 400 can be implemented by PMD 202 in hardware, software, or a combination thereof. As software, process 400 can be encoded as program code stored on a machine-readable storage medium.

Process 400 begins when PMD 202 establishes communication with accessory 204 (block 402). In one set of embodiments, this can include identifying and authenticating accessory 204 using the general lingo of the PMD-specific protocol described above.

At block 404, PMD 202 can enter radio or TV mode. In some embodiments PMD 202 can enter radio/TV mode in response to a command received from accessory 204 (e.g., block 304 of process 300). In alternative embodiments, PMD 202 can enter radio/TV mode in response to a user entering an input signal via user input device 212 of PMD 202, or to establishing communication with accessory 204 at block 402. In certain embodiments, entering radio/TV mode can cause PMD 202 to launch RF tuner application 216 and exit any other currently-running audio/video playback applications (e.g., a media playback application for playing back stored media assets). If radio/TV mode is not entered immediately, process 400 can wait at block 404 until radio mode is to be entered; PMD 202 can perform other operations while process 400 waits.

At block 406, PMD 202 can receive one or more commands from accessory 204 requesting information about the capabilities of RF tuner 210. An example of such a command is GetTunerCaps (described above with respect to block 306 of process 300). In response, PMD 202 can send one or more commands to accessory 204 including the requested tuner capability information (block 408). An example of such a command is RetTunerCaps (described above with respect to block 308 of process 300).

At block 410, PMD 202 can receive one or more commands from accessory 204 requesting notification of status changes or desired types of data pertaining to the tuner. Examples of such commands include SetStatusNotifyMask, SetRdsNotifyMask, and SetHDDataNotifyMask (described above with respect to block 310 of process 300). In response, PMD 202 can register accessory 204 to receive the requested notifications, and can send one or more commands asynchronously to accessory 204 reporting the requested notifications (block 412). Examples of such commands include StatusChangeNotify, RdsNotify and HDDataReadyNotify (described above with respect to block 312 of process 300).

In some embodiments, upon receiving the RdsReadyNotify or HDDataReadyNotify command, PMD 202 can receive a GetRdsData or GetHDData command from accessory 204 requesting the RDS/RBDS or SIS/PSD metadata. In response, PMD 202 can send a RetRdsData or RetHDData command to accessory 204 including the RDS/RBDS or SIS/PSD metadata.

At block 414, PMD 202 can receive one or more commands from accessory 204 requesting information about the state and/or status of RF tuner 210. Examples of such commands include GetTunerBand, GetTunerFreq, GetTunerStatus, GetHDProgramService, GetHDProgramServiceCount, GetStatusNotifyMask, GetRdsNotifyMask, GetHDDataNotifyMask, GetRdsReadyStatus, and GetHDDataReadyStatus (described above with respect to block 314 of process 300). In response, PMD 202 can send one or more commands to accessory 204 including the requested tuner state information (block 416). Examples of such commands include RetTunerBand, RetTunerFreq, RetTunerStatus, RetHDProgramService, RetHDProgramServiceCount, RetStatusNotifyMask, RetRdsNotifyMask, RetHDDataNotifyMask, RetRdsReadyStatus, and RetHDDataReadyStatus (described above with respect to block 316 of process 300).

At block 418, PMD 202 can receive one or more commands from accessory 204 including information for controlling, or changing one or more settings of, RF tuner 210. Examples of such commands include SetTunerCtrl, SetTunerMode, SetTunerBand, SetTunerFreq, SetTunerSeekRssi, TunerSeekStart, and SetHDProgramService (described above with respect to block 318 of process 300).

At block 420, PMD 202 can generate audio and/or video data from radio signals received via RF tuner 210 and send the audio/video data to accessory 204. In certain embodiments, the audio/video data can be generated in response to one or more tuner control commands received at block 418. For example, if PMD 202 receives a SetTunerFreq command to change the tuner frequency to 87.5 Mhz, PMD 202 can cause RF tuner 210 to tune in to 87.5 Mhz, receive radio signals at that frequency, and convert the radio signals to audio signals for transmission to accessory 204. In embodiments where the broadcast is an analog radio broadcast, PMD 202 can send analog audio signals to accessory 204. In embodiments where the broadcast is a digital radio broadcast (e.g., HD Radio, satellite radio, etc.), PMD 202 can send digital and/or analog audio signals to accessory 204. In embodiments where the broadcast is an analog TV broadcast, PMD 202 can send analog audio/video signals to accessory 204. In embodiments where the broadcast is a digital TV broadcast (e.g., ATSC, DVB), PMD 202 can send digital and/or analog audio/video signals to accessory 204. PMD 202 can also send other types of data to accessory 204, such as metadata included in the broadcast. Examples of such metadata include RDS/RBDS metadata (in the case of an analog radio broadcast) and SIS or PSD metadata (in the case of a digital/HD radio broadcast).

At block 422, PMD 202 can exit radio/TV mode. In some embodiments, PMD 202 can exit radio/TV mode in response to a command received from accessory 204 (e.g., block 322 of process 300). In alternative embodiments, PMD 202 can exit radio/TV mode in response to a user entering an input signal via input device 212 of PMD 202, or to PMD 202 becoming disconnected from accessory 204. In one set of embodiments, exiting radio/TV mode can cause PMD 202 to exit RF tuner application 216. In further embodiments, if any other audio/video playback application (e.g., a media playback application for playing stored media assets) was active at the time radio/TV mode was entered at block 404, that audio playback application may be automatically re-launched upon exiting radio/TV mode at block 422. If no condition for exiting radio/TV mode is triggered, processing can return to any of blocks 406-420.

It should be appreciated that processes 300 and 400 are illustrative and that variations and modifications are possible. Blocks described as sequential may be executed in parallel, order of blocks may be varied, and blocks may be modified, combined, added, or omitted. In one set of embodiments, PMD 202 can return one or more acknowledgement commands to accessory 204 that acknowledge receipt and/or processing of a previous command sent by accessory 204. In cases where a command sent by accessory 204 includes a request for data (e.g., the commands requesting tuner capability information at block 306 of process 300), acknowledgment can be implicit in the return command sent by PMD 202 that includes the requested data.

Further, it should be appreciated that the commands described with respect to processes 300 and 400 are illustrative and not intended to limit embodiments of the present invention. For example, some of the commands can be replaced with other commands or a combination of commands. In certain embodiments, some of the commands may not be supported by particular PMDs or accessories.

While the invention has been described with respect to specific embodiments, one of ordinary skill in the art will recognize that numerous modifications are possible. For example, a "PMD" as used herein refers generally to any portable device with any form of radio receiving capability; a broad range of functionality may be incorporated, including other media playback capability and/or two-way communication capability. Similarly, the term "accessory" can include any electronic device capable of communication with a PMD to control RF tuner operations. An "RF tuner" as used herein can receive a variety of broadcast media including terrestrial radio (analog, digital, or hybrid digital), satellite radio, Internet radio, analog TV, digital TV, and satellite TV.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible device, or the program code may be provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method comprising:
sending, by an accessory, one or more first commands to a portable media device, wherein the portable media device includes a tuner configured to tune radio frequency signals, and wherein the one or more first commands request tuner capability information indicating one or more capabilities of the tuner, the tuner capability information including at least one of types of bands the tuner supports, resolution the tuner supports for each band, types of controls the tuner supports, or types of modes the tuner supports;
receiving, by the accessory, one or more second commands from the portable media device, the one or more second commands including the tuner capability information; and sending, by the accessory, one or more third commands to the portable media device, the one or more third commands including tuner control information for controlling the tuner.

2. The method of claim 1 wherein the tuner control information includes one or more of: a command for controlling a band setting of the tuner, a command for controlling a frequency setting of the tuner; a command for controlling a mode setting of the tuner, or a command for controlling a power setting of the tuner.

3. The method of claim 1 wherein the tuner control information is based on the tuner capability information.

4. The method of claim 1 further comprising receiving, by the accessory, audio data from the portable media device in response to sending the one or more third commands.

5. The method of claim 1 further comprising receiving, by the accessory, broadcast metadata from the portable media device in response to sending the one or more third commands.

6. The method of claim 1 further comprising sending, by the accessory, one or more fourth commands to the portable media device, the one or more fourth commands instructing the portable media device to automatically send notifications to the accessory indicating state changes to the tuner.

7. The method of claim 1 wherein the accessory is configured to communicate with the portable media device wirelessly.

8. The method of claim 1 further comprising sending, by the accessory, one or more fourth commands to the portable media device requesting status changes of the tuner, the one or more fourth commands including a bitmask identifying a specific status change in the tuner that should invoke the portable media device to send a notification to the accessory.

9. A method comprising:
sending, by an accessory, one or more first commands to a portable media device, wherein the portable media device includes a tuner configured to tune radio frequency signals, and wherein the one or more first commands request tuner capability information indicating one or more capabilities of the tuner, the tuner capability information including at least one of types of bands the tuner supports, resolution the tuner supports for each band, types of controls the tuner supports, or types of modes the tuner supports;
receiving, by the accessory, one or more second commands from the portable media device, the one or more second commands including the tuner capability information;
sending, by an accessory, one or more third commands to the portable media device, the one or more third commands requesting tuner state information indicating a current state of the tuner;
receiving, by the accessory, one or more fourth commands from the portable media device, the one or more fourth commands including the tuner state information; and
sending, by the accessory, one or more fifth commands to the portable media device, the one or more fifth commands including tuner control information for controlling the tuner, wherein the tuner control information is based on the tuner capability information or the tuner state information.

10. An accessory comprising:
an interface adapted to be communicatively coupled with a portable media device having a radio frequency (RF) tuner; and
a control component communicatively coupled with the interface and configured to:
send one or more first commands to the portable media device, the one or more first commands requesting tuner capability information indicating one or more capabilities of the tuner, the tuner capability information including at least one of types of bands the tuner supports, resolution the tuner supports for each band, types of controls the tuner supports, or types of modes the tuner supports;
receive one or more second commands from the portable media device, the one or more second commands including the tuner capability information; and
send one or more third commands to the portable media device, the one or more third commands including tuner control information for controlling the tuner.

11. The accessory of claim 10 wherein the interface includes a connector comprising a plurality of signal pins, the signal pins being arranged to mate with corresponding signal pins on a mating connector of the portable media device.

12. The accessory of claim 10 wherein the interface is a wireless interface.

13. The accessory of claim 10 wherein the control component is further configured to:
send one or more fourth commands to the portable media device, the one or more fourth commands requesting tuner state information indicating a current state of the tuner; and
receive one or more fifth commands from the portable media device, the one or more fifth commands including the tuner state information.

14. The accessory of claim 13 wherein the accessory further comprises an output device, and wherein at least a portion of the tuner state information is outputted to a user via the output device.

15. The accessory of claim 13 wherein the tuner state information includes one or more of: current band information, current frequency information, current mode information, or current received signal strength (RSSI) information.

16. A method comprising:
receiving, by a portable media device having a radio frequency (RF) tuner, one or more first commands from an accessory, the one or more first commands requesting tuner capability information indicating one or more capabilities of the tuner, the tuner capability information including at least one of types of bands the tuner supports, resolution the tuner supports for each band, types of controls the tuner supports, or types of modes the tuner supports;
sending, by the portable media device, one or more second commands to the accessory, the one or more second commands including the tuner capability information;
receiving, by the portable media device, one or more third commands from the accessory, the one or more third commands including tuner control information for controlling the tuner; and
controlling, by the portable media device, the tuner based on the tuner control information.

17. The method of claim 16 wherein, prior to receiving the one or more first commands, verifying by the portable media device that the accessory has been authenticated to interoperate with the portable media device.

18. The method of claim 16 wherein the tuner control information specifies a frequency, and wherein the method further comprises, by the portable media device:
tuning the tuner to the specified frequency;
receiving radio signals at the specified frequency;
converting the radio signals into audio data; and
sending the audio data to the accessory.

19. A portable media device comprising:
a tuner configured to tune radio frequency (RF) signals;
a storage device configured to store a plurality of media assets;
an interface adapted to be communicatively coupled with an accessory; and
a control component configured to:
- receive one or more first commands from the accessory, the one or more first commands requesting tuner capability information indicating one or more capabilities of the tuner, the tuner capability information including at least one of types of bands the tuner supports, resolution the tuner supports for each band, types of controls the tuner supports, or types of modes the tuner supports;
- send one or more second commands to the accessory, the one or more second commands including the tuner capability information; and
- receive one or more third commands from the accessory, the one or more third commands including tuner control information for controlling the tuner.

20. The portable media device of claim 19 wherein the tuner is configured to tune analog broadcasts or digital broadcasts.

21. The portable media device of claim 19 wherein the tuner is configured to tune terrestrial signals or satellite signals.

22. The portable media device of claim 19 wherein the interface includes a connector comprising a plurality of signal pins, the signal pins being arranged to mate with corresponding signal pins on a mating connector of the accessory.

23. The portable media device of claim 19 wherein the interface is a wireless interface.

24. The portable media device of claim 19 wherein the portable media device further comprises a media playback component configured to play back media assets stored on the storage device, and wherein the tuner control information includes one or more of: a command for disabling the tuner and enabling media playback via the media playback component, or a command for enabling the tuner and disabling media playback via the media playback component.

25. The portable media device of claim 19 wherein the portable media device further comprises a headphone jack for accepting a plug for headphones, and wherein the headphones are configured to function as an antenna for the tuner.

* * * * *